US009825956B2

(12) United States Patent
Kelley et al.

(10) Patent No.: US 9,825,956 B2
(45) Date of Patent: Nov. 21, 2017

(54) SYSTEMS AND METHODS FOR ACCESS PERMISSION REVOCATION AND REINSTATEMENT

(71) Applicant: NETFLIX, INC., Los Gatos, CA (US)

(72) Inventors: Patrick Kelley, Los Gatos, CA (US);
Ben Hagen, Los Gatos, CA (US);
Jason Chan, Los Gatos, CA (US);
Kevin Glisson, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 5 days.

(21) Appl. No.: 14/876,629

(22) Filed: Oct. 6, 2015

(65) Prior Publication Data
US 2017/0099292 A1 Apr. 6, 2017

(51) Int. Cl.
*H04L 29/06* (2006.01)
*H04L 29/08* (2006.01)

(52) U.S. Cl.
CPC .............. *H04L 63/10* (2013.01); *H04L 63/20* (2013.01); *H04L 67/10* (2013.01); *H04L 67/306* (2013.01)

(58) Field of Classification Search
CPC ....................................................... H04L 63/10
See application file for complete search history.

(56) References Cited

U.S. PATENT DOCUMENTS

| 7,437,362 B1* | 10/2008 | Ben-Natan ......... G06F 21/6227 |
| 7,516,285 B1* | 4/2009 | Haynes ............. G06F 17/30197 |
| | | 711/162 |
| 8,051,491 B1* | 11/2011 | Cavage .............. G06F 21/6218 |
| | | 707/609 |
| 9,009,111 B2* | 4/2015 | Vermeulen ........ G06F 17/30212 |
| | | 707/626 |
| 2005/0262132 A1* | 11/2005 | Morita .............. G06F 21/6218 |
| 2008/0091978 A1* | 4/2008 | Brodsky ............ G06F 11/3466 |
| | | 714/38.14 |
| 2012/0226712 A1* | 9/2012 | Vermeulen ........ G06F 17/30212 |
| | | 707/770 |

(Continued)

OTHER PUBLICATIONS

Karjoth, Gunter. "Access control with IBM Tivoli access manager."ACM Transactions on Information and System Security (TISSEC) 6.2 (2003): 232-257.*

*Primary Examiner* — Shawnchoy Rahman
(74) *Attorney, Agent, or Firm* — Haynes and Boone, LLP

(57) ABSTRACT

Provided herein are systems and methods of managing permissions for applications deployed in a distributed computing infrastructure. An exemplary system includes an access management server having a processing device, a distributed computing infrastructure in communication with the management server having a plurality of resource instances and a request log, an administration system having a security application executing thereon. The security application has access policies associated with each of a plurality of applications. The processing device of the management server: receives application request information from the request log describing requests made by a first application being monitored by the access management server. The management server receives an access policy describing a set of accessible APIs associated with the first application from the security application and determines that access to a first API of the set should be removed, and modifies the access policy to remove access to the first API.

20 Claims, 9 Drawing Sheets

(56) References Cited

U.S. PATENT DOCUMENTS

2014/0189880 A1\* 7/2014 Funk ................. G06F 21/62
726/27
2015/0081918 A1\* 3/2015 Nowack ................ H04L 29/06
709/227

\* cited by examiner

SYSTEMS AND METHODS FOR ACCESS PERMISSION REVOCATION AND REINSTATEMENT

TECHNICAL FIELD

The present disclosure relates generally to the management of access permissions associated with objects accessible in a networked environment. Specifically, the disclosure relates to the management of access permissions relating to application programming interfaces (APIs) in a distributed computing environment.

BACKGROUND

Increasingly, information is stored and accessed via remote computing devices. Local computing devices, such as a client device, can be used to access and interact with remote computing devices to retrieve information such as the documents, videos, images, applications, and others. These remote computing devices may also interact with local computing devices to deploy applications coded on the local computing devices into clusters of remote computing devices, such as a distributed computing environment, commonly referred to as "a cloud" or "the cloud."

Some of the information that is remotely accessed is information that is sensitive in some regard. For example, the information may include sensitive personal or financial information or may include information protected by copyright or other legal structures. Authorizing one set of users to access one set of information while denying access to another set or other sets of information is an area in which substantial progress has been made over the years.

However, the increasing reliance and utilization of distributed computing environments has complicated the provisioning of access to information, resources, and functions to those entities that should be authorized to access that information, those resources, and those functions. Accordingly, current approaches to providing access permissions within distributed computing environments have not been entirely satisfactory.

Figure 1:
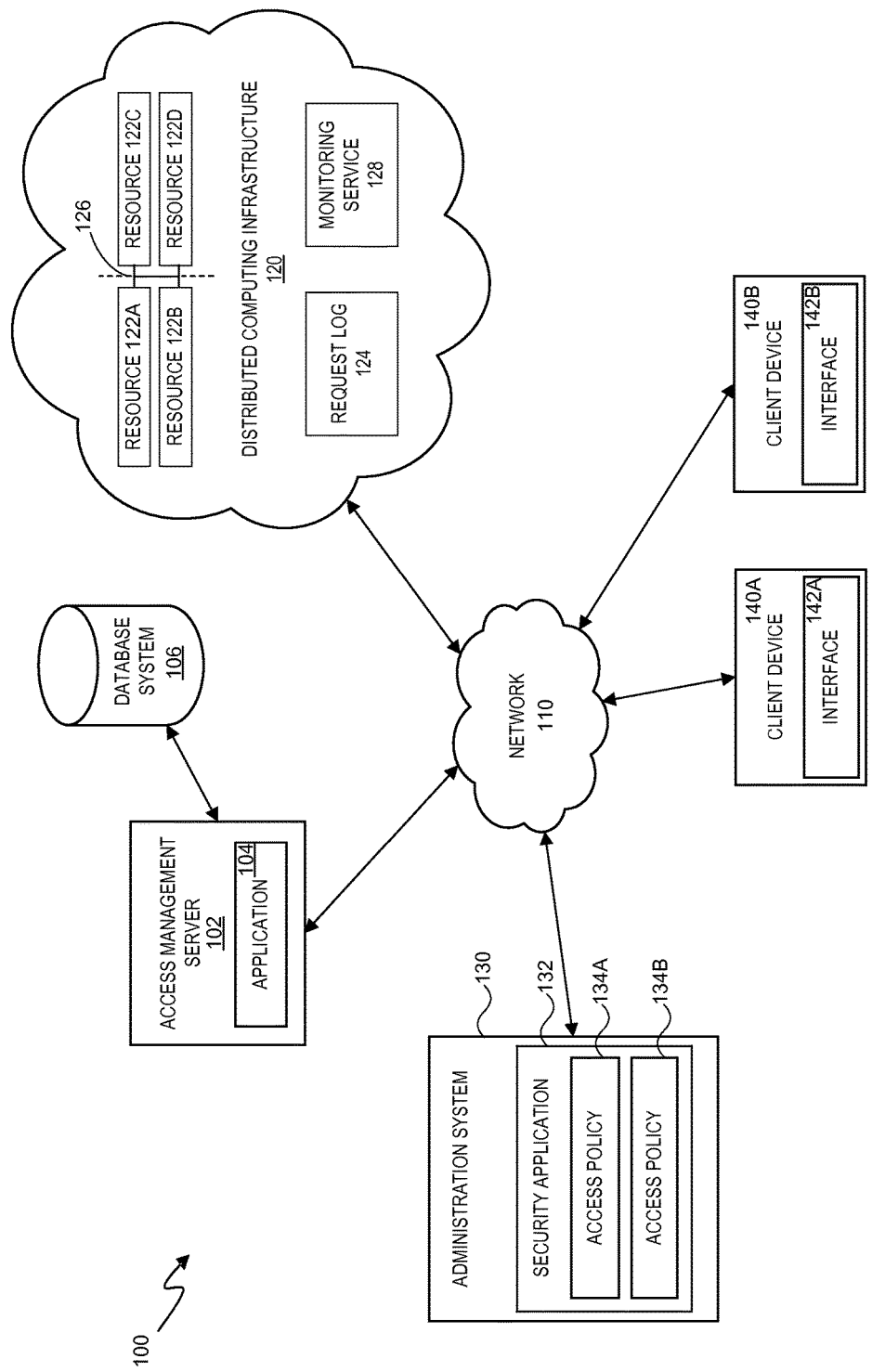
FIG. 1 is a block diagram of access management system including an access management server that may grant, revoke, and reinstate access, according to some aspects of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, some well-known process steps have not been described in specific detail in order to avoid unnecessarily obscuring the present disclosure. Additionally, other applications of the concepts and principles described herein are possible, such that the following examples should not be taken as limiting. For example, while many of the examples disclosed herein are directed to the detection and management of API access in the context of a streaming video service, the principles and concepts described may be applied to provide more generally for the revocation, reinstatement, and request of API access for a plurality of applications deployed at scale.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these embodiments are not limiting, such that other embodiments may be used, and changes may be made without departing from the spirit and scope of the invention. For example, changes within the scope of this disclosure may include performing an operation on a different system or device, etc.

Devices, systems, and methods are provided for managing access permissions in a distributed computing environment. Managing access permissions may include granting access, revoking access, and reinstating access after revocation. The access permissions may provide or deny access to a plurality of objects accessible within or from the distributed computing environment. Access to an object may include access to make calls on specific application programming interfaces (APIs) presented or exposed by distributed computing infrastructure.

As a non-limiting example, reference may be made here in to Amazon Web Services (AWS) as an example of a distributed computing infrastructure or cloud computing infrastructure. The distributed computing infrastructure may provide resources for computing as well as for storage, networking, and other functions or services provided by collections of remote computing devices. For example, the distributed computing infrastructure may include scalable storage, virtual servers and virtual networks, databases, analytics services, application services (e.g., email, push notification, workflow services) and application deployment and management services.

As part of the application deployment and management services, the distributed computing infrastructure may provide user activity logging. This activity logging may include a log of requests made by resources or resource instances associated with one or more accounts of a consumer or customer of the distributed computing infrastructure. For example, AWS includes a service referred to as CLOUD-TRAIL™. CLOUDTRAIL™ is an example of a distributed computing service that records API calls within the AWS environment and delivers a log to a device operated by the consumer. Comparable API call logs may be provided in other distributed computing infrastructure embodiments. The log may include information identifying the caller of the API, the time of the call, the source IP address of the caller, the parameters included in the call, and response elements such as error messages resulting from the call. In some embodiments, a region of the distributed computing infrastructure in which the API call originated may also be specified in the log. In general the application deployment and management services may provide such information to and access management service operated by the consumer of distributed computing services.

A consumer of distributed computing services may have information regarding one or more applications deployed to the distributed computing infrastructure. Such information may include an access policy associated with the one or more applications. The access policy of a given application may indicate the permissions associated with that application. For example, an access policy may indicate or list APIs that an application is permitted to call within the distributed computing infrastructure. In general, the access management server may be provided with a set of permissions, e.g. an access policy, associated with any entity existing within the purview of the access management system. Such entities may include users having user accounts as well as individual applications. In some embodiments, each individual application may be handled in the system as if it were a user, having its own individual user account.

For example, AWS includes a service to provide AWS identity and access management (IAM). IAM provides services to manage users, which may be referred to as IAM users, as well as roles, referred to as IAM roles. IAM users or individual applications may be assigned an IAM role. The application may be provided by another service of the distributed computing infrastructure, such as another AWS service such as an Amazon Elastic Compute Cloud (EC2) instance or an Amazon Simple Storage Service (S3) instances, for example.

When an application deployed within the distributed computing infrastructure makes an API call in order to access another service or application operating within the distributed computing infrastructure, the request for access may be logged as well as responded to by the service or application at issue. When an error is detected, such as an error indicating that one or more parameters associated with the call is improper or an error indicating that access is denied, this error may also be logged in association with the request and with the associated application.

In order to provide for secure operating environment, it may be desirable that an application be provided with the access to other applications and services that it needs and be denied access to other applications and services that it does not need to serve its function. For example, an application may, at least temporarily, be provided with access to an API used in obtaining sensitive financial information, such as a credit card number, of a user of services provided by the customer of the distributed computing infrastructure via the distributed computing infrastructure. The access may be revoked if it is determined not to be necessary. In a first state, a new application may be provided with an access policy that includes access to more objects or other APIs then the application may be determined to need in the future. For example, the new application may have a scheduled rollout that includes additional services that are not operational upon initial deployment of the application. However, it is anticipated that the additional services will, in the future, rely on specific permissions, such as permissions to call a specific API. Given this situation, the new application may be deployed with an overly permissive access policy in view of the scheduled rollout.

The access management system may retrieve information from the request log indicating what information, files, or functions have been requested by the new application during a predetermined time or period of observation, such as two weeks or a month. If the access management system determines that the number of requests to access the information, files, or functions is below a threshold value or threshold number, the access management system may direct that the access policy associated with the new application be modified to remove access to the unused or underused information, files, or functions. In this way, even though the new application may be deployed with an overly permissive access policy, the access policy may be curtailed or modified to remove certain access. For example, if an application makes no calls to an API or makes fewer calls to an API than a predetermined threshold number of calls, the access policy associated with that application may be modified to remove access to the API.

As noted, when the first application is associated with a scheduled rollout of features or services, the features or services associated with the API to which access was removed may become operational after the removal of necessary access. The access management system may provide a user, such as a developer or any developer from a team of developers, with the ability to request reinstatement of access to the API that was removed from the access policy. For example, after one month of insufficient use of an API by a first application, the access management system may revoke or remove access to that API by the first application. One week later, the scheduled features that are to utilize the API may be ready to be deployed. A developer associated with the first application may request reinstatement of access to the API. The access management system may recognize that the original access policy included access to the API and may recognize that the access was revoked only one week before. The access management may determine from this information and/or other information that the access to the API should be restored or reinstated. The access management system may automatically restore access to the API, without the intervention of any administrative security personnel.

Additionally, when the request logs indicate that an error is resulting frequently from a call made by a specific application, the access management system may revoke access to that call from an access policy associated with a specific application. The access management system may notify administrative security personnel and/or a developer or developer team associated with the specific application. This notification, which may be an email, a short message service (SMS) message, a push notification, or other such communication, may encourage corrective measures, such as a repair to the code or a replacement of the code, or another appropriate corrective measure.

In some embodiments of distributed computing infrastructure, in the event that the application continues to make calls resulting in errors, including access denied errors, the distributed computing infrastructure may throttle calls associated with the application. In some distributed computing infrastructures, such as AWS, other calls associated with the AWS account may also be throttled or rate limited even if those calls are not resulting in errors. Accordingly, the prevention of erroneous API calls on the part of a single application may improve performance, or prevent a degrading in performance, of all systems and services being provided in connection with a specific AWS account or other distributed computing infrastructure account.

The access management system may provide one or more user interfaces by which users such as developers and users such as administrative security personnel may access information associated with modifications to access policies associated with specific applications. For example, a user interface may provide a developer with interface elements that may be manipulated to request reinstatement of a revoked permission to call a specific API. Depending on the conditions associated with the request, the access management system may automatically reinstate access by automatically modifying the access policy associated with the specific application, or the access management system may send a communication to administrative security personnel requesting that the administrative security personnel determine whether or not access should be reinstated.

Other examples describing the components and the operations of access management system are provided herein. Combinations of these components and operations are within the scope of the present disclosure, including combinations specifically described and combinations that would be apparent to one of ordinary skill in the art based upon a careful reading of the present disclosure. Embodiments of the present disclosure may permit for automatic modification of access policies associated with applications deployed in a distributed computing infrastructure or environment.

Referring now to FIG. 1, shown therein is a block diagram of an access management system 100 that includes an access management server 102. As described herein, embodiments of the access management server 102 may include a processing device in communication with one or more storage systems or devices, which may store instructions for an access management application 104. The access management server 102 may be configured to receive information from a plurality of networked resources and, based on that information, modify an access policy associated with one or more applications deployed within a distributed computing environment. For example, the access management server 102 may be operated by Netflix, Inc. of Los Gatos, Calif., which may also operate systems for the creation of user accounts and for the streaming or other consumption of media content, such as movies, television shows, and other video-based and/or audio-based programming.

The access management server 102 is configured in communication with a database system 106 that may include information regarding entities existing within the purview of the access management server 102 and information regarding the requests for access to objects by those entities. Additionally, the database system 106 may include information describing access policies associated with those entities. As described herein, an entity may be a human user having a user account or a nonhuman user such as an application or service. The objects for which access is requested may be files, applications, services, APIs, or other digital objects present in the environment of the access management system 100. The database system 106 may include information obtained from other networked devices or systems included within the overall access management system 100.

For example, the access management server 102 may communicate over a network 110 with a distributed computing infrastructure 120, with an administration system 130, and with one or more client devices such as client devices 140A and 140B. As described, data communications between the access management server 102 and other components and devices illustrated in FIG. 1, may be transmitted over the network 110, which may include one or more networks such as a LAN, a WAN, a WWAN, a WLAN, a mobile telephone network, a landline telephone network, as well as other suitable networks. The network 110 may include a plurality of networks coupled together. As shown in FIG. 1, network 110 may include a private network, such that communication between the access management server 102 and the administration system 130 may not pass over publicly available communication lines or may be suitably encrypted for transit over the publicly available communication lines, while communication between the access management server 102 and the distributed computing infrastructure 120 may pass over publicly available communication lines. Accordingly, the network 110 may include both a private network, including a virtual private network (VPN), and a public network.

As noted, FIG. 1 illustrates that the access management server 102 communicates with the distributed computing infrastructure 120 over network 110. The distributed computing infrastructure 120 may include a plurality of servers and storage devices configured to provide a plurality of resource instances 122A, 122B, 122C, and 122D. A commercially available example of an appropriate distributed computing infrastructure 120 may be or be similar to the distributed computing infrastructure provided by Amazon Web Services, Inc. (AWS). In an embodiment in which the distributed computing infrastructure 120 is AWS, the resource instances 122A-D include a plurality of Amazon EC2 instances, a plurality of database instances such as an Amazon RDS instance, and storage instances such as an Amazon S3 bucket, and each of instances 122A-D may be provided by a plurality of computing and/or storage devices. The operator of the access management server 102 may deploy a plurality of applications to the distributed computing infrastructure 120 such that the applications are executed on hardware owned by a third-party operator, such as AWS.

As illustrated in FIG. 1, the distributed computing infrastructure 120 includes a request log 124 which may be a log of access requests made to or within the distributed computing infrastructure 120. For example, a first application executing on resource instance 122A may request to access information stored on resource instance 122D. In some embodiments, the resource instance 122A may communicate with the resource instance 122D over a virtual network 126 provided by the distributed computing infrastructure 120. In order to request to access information stored on the resource instance 122D, the resource instance 122A may call a specific API. When the resource instance 122A calls the specific API, a monitoring service 128 operating within the distributed computing infrastructure 120 may detect the call and record associated information in the request log 124. The monitoring service 128 may provide application deployment and management services within the distributed computing infrastructure 120. The request log 124 may include text information and/or numerical information describing each API call associated with the account. The information associated with a particular API call may include an identifier of the user or role (or application having been assigned a role) that called the API, the API called, the time of the call, the source IP address of the caller, parameters included in the API call, and any responses returned including error messages such as an access denied error.

The information in the request log 124 may be obtained upon request by the access management server 102. In some embodiments, the access management server 102 may be configured to automatically duplicate the request log 124 in the database system 106. The monitoring service 128 may be configured to update the request log 124 according to a schedule, e.g. every 15 minutes, every half hour, or every hour. The access management server 102 may access and duplicate the contents of the request log 124 on the same schedule or on a different schedule.

The administration system 130, which may be operated by the operator of the access management server 102, includes a security application 132 executing thereon. The security application 132 includes a plurality of access policies, illustrated as access policies 134A and 134B. Each of the access policies 134A and 134B may be associated with a specific entity, such as a specific user or a specific application. For example, the access policy 134A may be associated with a first application deployed within the distributed computing infrastructure 120. The access policy may indicate a list of objects that the application may access. For example, the access policy 134A may list a plurality of APIs that the first application has permission to call. In some embodiments, the access policies 134A and 134B may describe levels of access or categories of access that can be translated by an intermediary to determine whether the associated user or application should be provided with access to a specific object. The security application 132 may communicate with the distributed computing infrastructure 120 to determine access policies present within the distributed computing infrastructure 120 and may copy those access policies to provide the access policies 134A and 134B. In some embodiments, a copy of the access policies 134A and 134B is included in the database system 106 to be more readily accessible to the access management server 102 and the access management application 104 running thereon. The security application 132 may operate continuously and collect a log of access information to generate the access policies 134A and 134B.

The access management server 102 may access information, which may be stored in the request log 124, the access policies 134A and 134B, and/or in the database system 106 and determine that access to a first object by a first entity should be removed. This determination may be based on usage, such as a count of times that the first entity accesses the first object during a predetermined time or a period of observation. When the count is less than a threshold value, the access management server 102 may cause a modification to the access policy associated with the first entity that removes or curtails access to the first object. For example, the access management server 102 may determine that a first application has not accessed a first API during a period of observation. The access management server 102 may cause the access policy associated with the first application to be modified to omit or remove access to call the first API. Alternatively, the access management server 102 may determine that the first application called the first API fewer than 30 or 40 times (or another threshold value) during the period of observation. In some embodiments, the access management server 102 uses a threshold value of zero, such that it determined whether the first application has called the first API or not during the period of observation.

The period of observation may be used as an alternative or as a second thresholding variable. If the first application calls the first API at all during the period of observation, then the access management server 102 may not modify the access policy of the first application. Accordingly, the period of observation may be adjusted to a longer or a shorter time as desired. For example, the period of observation may be set to a day, a week, or a month. Additionally, the period of observation may be dependent on the particular API itself. During normal operation of services, a first API may be called more than a second API. In some embodiments, the access management server 102 may include a table of periods of observation, with a desired period of observation associated with each API. The access management server 102 may modify the access policy associated with the first application. In some embodiments, the access management server 102 may communicate with the security application 132 to modify the access policy associated with the first application.

In some embodiments, the determination that access by the first application to the first API should be removed includes determining from the request log that more than a threshold number of errors are being produced when the application calls the first API. For example, the access management server 102 may modify an access policy associated with the first application when the first application produces more than 5 or 10 errors during a period of observation in calls to the first API. Depending on the particular API, the threshold number of errors may be more than 100 or more than 1000 during the period of observation. The request log 124 may indicate in an error message the type of error being triggered by the call to the first API. The threshold value applied to determine whether or not access to the first API by the first application should be removed may depend on the type of error resulting from the API call. For example, when the request log 124 indicates that the first application provoked a "denied access" type error when calling the first API, the threshold value applied may be a lower threshold value, such as 5 to 10 calls. The access policy associated with the first application may be modified to prevent the first application from calling the first API and thereby triggering more errors. Additionally, the threshold value may depend on the API being called. For example, the distributed computing infrastructure 120 may allow for certain APIs to be called thousands of times a minute, while other APIs may only be called once per minute. The errors permitted for each API before throttling occurs may depend on the particular API. When a more than a threshold number of errors are triggered or more than a threshold number of allowable calls are made, the distributed computing infrastructure 120 may begin throttling responses to subsequent calls. The throttling may be applied to the first application as well as to other applications deployed within the distributed computing infrastructure 120. Accordingly, in some embodiments performance of all of the services associated with an account in the distributed computing infrastructure 120 may be improved by limiting API access of a single service or single application associated with the account.

Each application may be assigned a role or identity within the distributed computing infrastructure 120. For example, when the distributed computing infrastructure 120 is an AWS infrastructure, the applications may each be assigned to or deployed as an IAM role. Each IAM role contains an IAM policy, a document that explicitly defines permissions associated with the IAM role. To revoke an application's permission to call a particular API, the access management server 102 may communicate with the distributed computing infrastructure 120 to modify the IAM policy associated with the application, for example, by editing text of the IAM policy.

The access management server 102 may schedule modification of an access policy after the determination that the access policy should be modified. For example, the access management server may schedule modification of an access policy associated with a first application for one day or one week after either the application calls a specific API more than the threshold number of times during the period of observation for that API or the application's calls to the specific API result in more than a threshold number of errors during a period of observation. In some embodiments, the access management server 102 may provide administrative security personnel with a user interface in which to set a default scheduling of modifications.

When the access management server 102 determines that access to a first object by a first entity should be revoked or removed, the access management server 102 may produce and transmit a communication to administrative security personnel. The communication or a similar communication may also be transmitted to the first entity, which may be a first user or one or more users associated with a first application. When the entity is an application deployed within the distributed computing infrastructure 120, the access management server 102 may send a communication to the responsible for the application, who may be a lead developer. In some embodiments, the access management server 102 may send the communication to every developer associated with the application. By providing notification of a scheduled change in access, before the change is to occur, a developer or administrative security personal may have the opportunity to review the scheduled change and modify, cancel, or request cancellation of the scheduled change.

The communication generated and transmitted by the access management server 102 may include an email, an SMS message, push notification, or any other suitable type of electronic communication that may be conveyed from one computing device to another computing device. The communication may be received on one of the client devices 140A and 140B. The client devices 140A and 140B shown in FIG. 1 may be computing devices such as personal computers, laptops, mobile-computing devices, such as tablet computers or smartphones, wearable computing devices, and/or any other computing devices having computing and/or communications capabilities in accordance with the described embodiments. The client devices 140A and 140B each include a processing device in communication with a data storage device or memory and are able to execute instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, (APIs), and so forth. As shown in FIG. 1, the client device 140A and 140B each execute software to provide an interface 142A and 142B, respectively. In some embodiments, the interfaces 142A and 142B may be provided in connection with a web-browsing program such as Internet Explorer®, Chrome®, etc. The client devices 140A and 140B may communicate with access management server 102, the administration system 130 and the distributed computing infrastructure 120 over the network 110.

In some embodiments, the client device 140A may be a client device used by administrative security personnel while the client device 140B is a client device used by a developer. The administrative security personnel and the developer may be required to log into or authenticate the client devices 140A and 140B to the access management server 102 to interact with the access management server 102 and the application 104 executing thereon. Exemplary interfaces that may be employed or provided by the access management server 102 in connection with the client devices 140A and 140B are described herein with respect to the exemplary interfaces in FIGS. 3-7.

In the illustrated embodiment of the access management system 100, the component systems such as the access management server 102, the administration system 130, and at least some of the hardware underlying the distributed computing infrastructure 120 may be provided by a server or cluster of servers. For example, the access management server 102 may be a computing device that comprises or implements one or more servers and/or software components that operate to perform various operations in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based operating system. It should also be appreciated that the server 102 illustrated in FIG. 1 may be deployed in other ways and that the operations performed and/or the services provided by such server or servers may be combined or separated for a given implementation and may be performed by a greater number or fewer number of individual server devices.

Further, although the access management server 102 and the administration system 130 are depicted in FIG. 1 as being separate from the distributed computing infrastructure 120, some embodiments of the present disclosure may include the access management server 102 and/or the administration system 130 as being provided by one of the resources 122A-D of the distributed computing infrastructure 120. For example, in embodiments in which the distributed computing infrastructure 120 is AWS, the access management server 102 may be provided by an Amazon EC2 instance executing an application defining the services and functions of the access management server 102.

Figure 2:
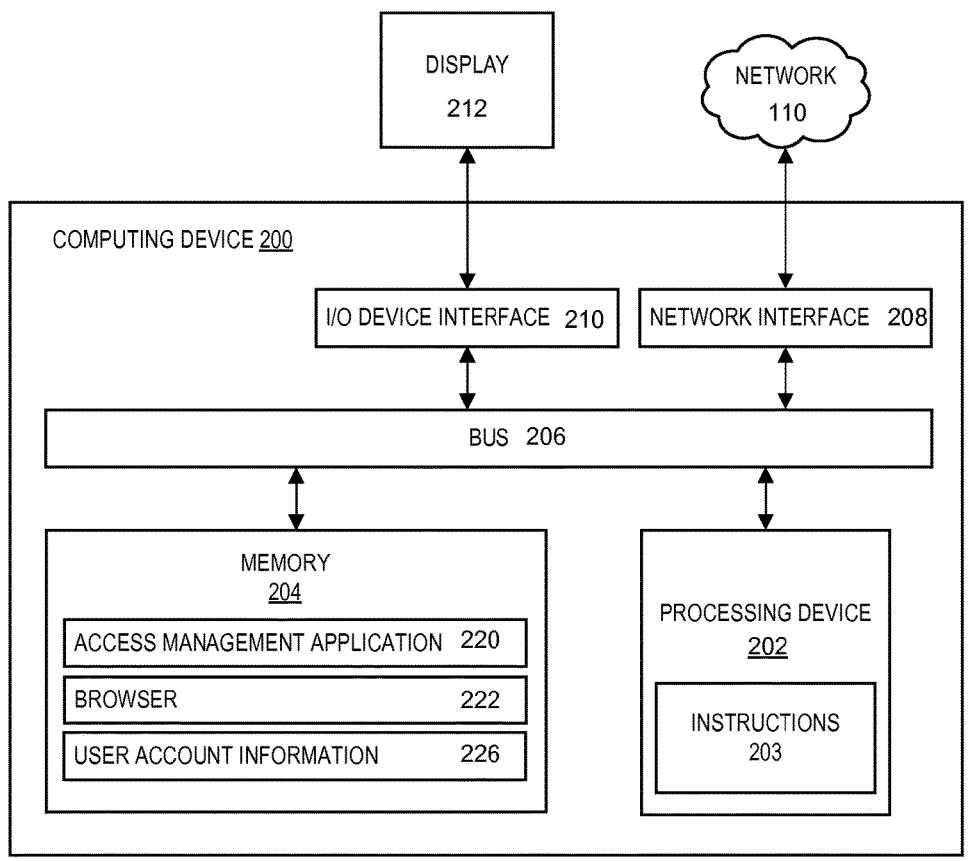
FIG. 2 is a block diagram of a computing device that may be employed as the access management server of FIG. 1, according to some aspects of the present disclosure.

Referring now to FIG. 2, shown therein is an exemplary embodiment of a computing device 200, embodiments of which may provide the access management server 102 of FIG. 1 as described herein or the client devices 140A and/or 140B. The computing device 200 includes a processing device 202, such as one or more processors or CPUs, in communication with a data storage device or memory 204 over a bus 206. The bus 206 further couples to a network interface device 208 and an I/O device interface 210. The network interface device 208 may be a network interface card or network interface controller (NIC) that permits the computing device 200 to communicate over the network 110 of FIG. 1. The I/O device interface 210 enables the computing device 200 to communicate information to be rendered to a display 212 to display information such as data and command options in one or more graphical user interfaces associated therewith. The I/O device interface 210 may further communicate with I/O devices such as infra-red or radio-frequency remote controls, keyboards, mice, touch-screens, etc. in some embodiments, the I/O device interface 210 may be an application programming interface (API) by which the other systems of FIG. 1 may communicate with the computing device 200.

The processing device 202 may execute software and/or other instructions 203 stored in the memory 204. The software and information stored in the memory 204 and the instructions 203 may be different depending on whether the computing device 200 is configured as the access management server 102, the administration system 130, one of the client devices 140A and 140B, or as a server underlying the distributed computing infrastructure 120. Additionally, the computing device 200 may be a virtual computing device in some embodiments, such as a configured resource instance in the distributed computing infrastructure 120.

The access management application 104 of FIG. 1 may be provided by executing instructions 203 on the processing device 202. As illustrated in FIG. 2, the memory 204 stores an access management application 220 and a browser 222. The access management application 220 may include a plurality of rules and/or algorithms that may be implemented as part of the access management application 220 to determine when access to a particular object should be revoked or removed from an access policy associated with a particular entity. For example, the access management application 220 may be configured to determine that a first application should no longer have access to a first API. In embodiments of the computing device 200 that may provide for the client device 140A or the client device 140B, the access management application 220 may be a client application configured to communicate with the access management server 102. Other embodiments of the computing device 200 that may provide for the client device 140A or 140B to include the browser 222 to communicate with the access management application 220 of an embodiment of the computing device 200 configured to provide the access management server 102.

The memory 204 may be a collection of memories of different types that are included in a housing of the client computing device or coupled to the computing device 200 and in communication therewith. For example, the memory 204 may include cache memory, RAM, ROM, a solid-state hard drive, a disk-based hard drive, and/or other types of non-transitory memory devices. The components depicted as stored on the memory 204 may be stored on and/or accessed from any combination of these different types of memories.

As illustrated in FIG. 2, the memory 204 includes a set of user account information 226, which may include information identifying entities having access permission, including an associated access policy, within the environment of the access management system 100. For example, the user account information 226 may include an account associated with a first application, an account associated with a developer or a developer team associated with the first application, an account associated with administrative security personnel. When the account included in the user account information 226 is associated with an application, the user account information 226 may include contact information for a developer or developer team that is associated with the application. In this way, when the access management server 102 transmits a communication associated with the application the communication may be directed to the developer or developer team.

Referring now to FIGS. 3, 4, 5, 6, and 7 shown therein are exemplary user interfaces that may be provided by the access management server 102 described herein in connection to FIGS. 1 and 2. The exemplary user interfaces may facilitate communication and interaction between users of the access management server 102, such as a developer or developer team and administrative security personnel of an organization, and the access management server 102 itself. The exemplary user interfaces may facilitate communication between the access management server 102 and the users thereof. For example, a user may log into the access management server 102 and be presented with one of the exemplary user interfaces to receive a notification or alert of a modification made to an access policy or a modification scheduled to be made to access policy. Additionally, the user interfaces may facilitate the handling of requests to grant access to one or more objects, such as APIs, requests to reinstate access to one or more objects, the access to which has been previously removed, and other requests. In some embodiments, the exemplary user interfaces may facilitate responses to such requests. For example, administrative security personnel may respond to requests for access to an API for an application by a developer of the application.

Figure 3:
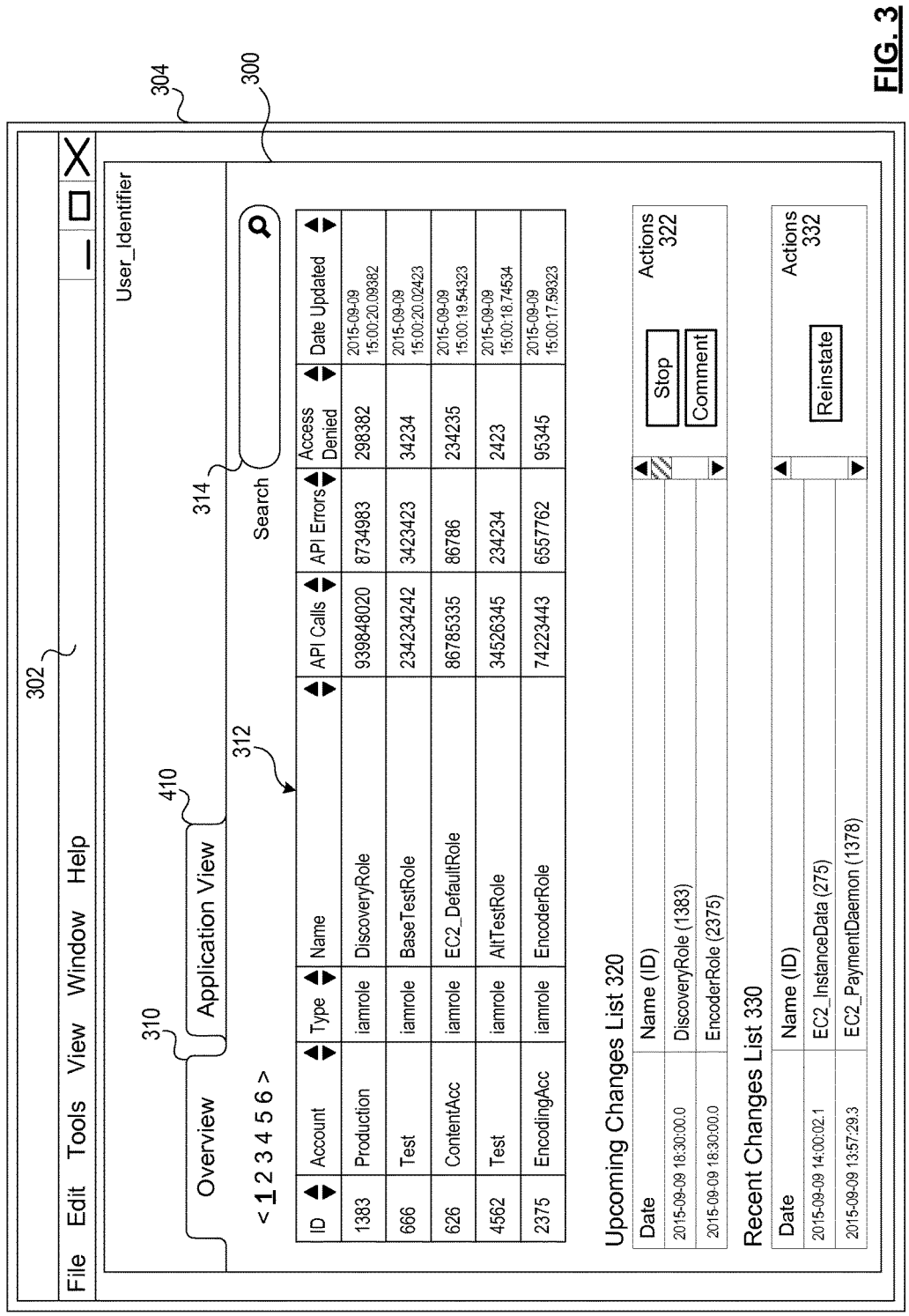
FIGS. 3, 4, 5, 6, and 7 are exemplary user interfaces that may be provided by the access management server of FIG. 1, according to some aspects of the present disclosure.

FIG. 3 illustrates an exemplary user interface 300 that may be presented to a developer after logging into the access management application 104 executing on the access management server 102. The exemplary user interface 300 may be displayed in a window 302 rendered to a display 304. The display 304 may be part of or coupled to the client device 140A to provide the user interface 300 as the interface 142A of FIG. 1. The exemplary user interface 300 may provide an overview tab 310 that includes a plurality of fields each providing an overview of a specific type of information to the user. The illustrated embodiment of the user interface 300 includes an overview table 312 that presents information to the user regarding one or more applications that are monitored by the access management server 102 to be presented to the user. The illustrated user interface 300 further includes an upcoming changes list 320 and a recent changes list 330.

The overview table 312 may include a row for each application being monitored by the access management server 102. As illustrated, the overview table 312 includes columns associated with an identifier of each application, an account in the distributed computing infrastructure 120 associated with the application, a type of application with respect to the distributed computing infrastructure 120, and a name of the application. The overview table 312 further includes counts of API calls, API errors, and access denied errors of each application. The overview table 312 further includes an indication of the date at which the information for each application was last updated. The overview table 312 may be sorted according to any of these columns. Additionally, a search field 314 may permit a user to search through the many applications listed in the overview table 312. In some embodiments, the user may be able to select an application in order to be presented with additional information specific to that application.

The upcoming changes list 320 may provide information to the user regarding scheduled modifications associated with a particular entity, such as the user or an application with which the user is associated. The upcoming changes list 320 may further indicate when each scheduled modification is scheduled to occur. By selecting on an application, a pop-up or other user interface element may provide information regarding the scheduled modification. The upcoming changes list 320 may present an action field 322 including a plurality of buttons or other user interfaces to permit the user to request that a scheduled modification be stopped or that permit the user to comment on a scheduled modification. A selection of the comment user interface element may cause the comment field to be presented to the user. The user may submit a comment in the comment field, which may then be relayed by the access management server 102 to administrative security personnel.

The recent changes list 330 may present information describing modifications recently enacted by the access management server 102. For example, when the access management server 102 removes access to an API by a first application, the first application may be identified along with the API and a date on which the modification occurred. The recent changes list 330 may include an action field 332 that includes a plurality of user interface elements whereby the user may request reinstatement of a removed access permission, such as reinstatement of access to the API.

Figure 4:
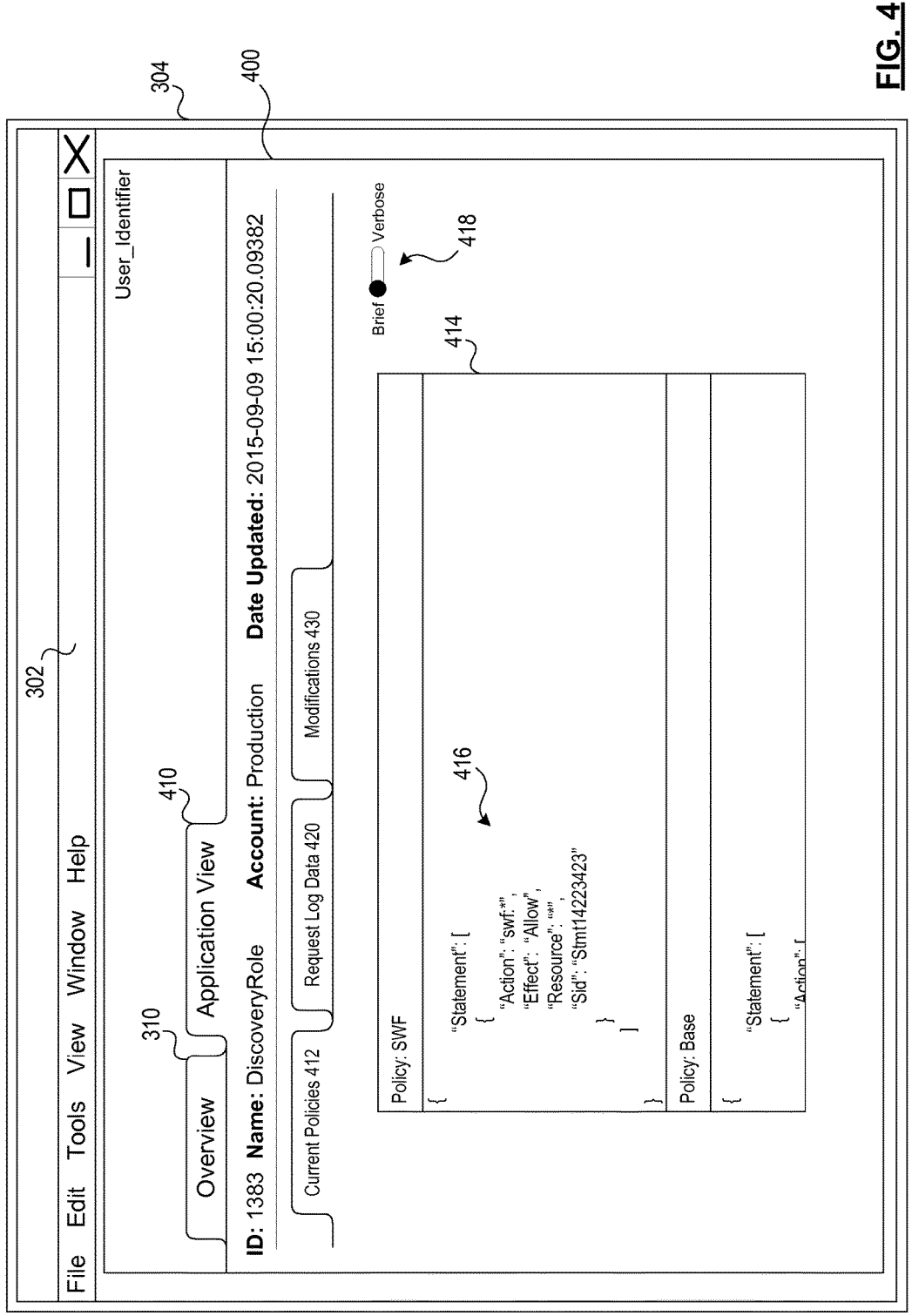

Referring now to FIG. 4, shown therein is a user interface 400 that is configured to provide information with respect to an application or a user. The user interface 400 may be used to view the current policies associated with the entity, view request log data associated with the entity, and request modifications to the policies associated with the entity for example. For example, the user interface 400 may be used by a user to request reinstatement of a previously removed access permission, or the user interface 400 may be used to request a new access permission.

As illustrated in FIG. 4, a current policies tab 412 is selected and includes a current policy field 414. The current policy field 414 includes a list of each of the policies associated with the application named "DiscoveryRole." The current policy field 414 includes a policy 416 that may be used to grant and/or deny permissions to the Discovery-Role application or to multiple instances thereof. As illustrated in FIG. 4, the policy 414 is presented in the JSON format, an open standard format with human-readable text. The user interface 400 includes a details element 418. The details element 418 may be toggled between a "brief" mode and a "verbose" mode. The policy 416 includes a wildcard policy "swf.*" that represents or stands in for a plurality of policies that include an "swf." prefix. When the "brief" mode is selected, the wildcard policy may be presented to the user in the policy 416. When the "verbose" mode is selected by the details element 418, each policy associated with the "swf." prefix may be displayed in the policy 416.

Figure 5:
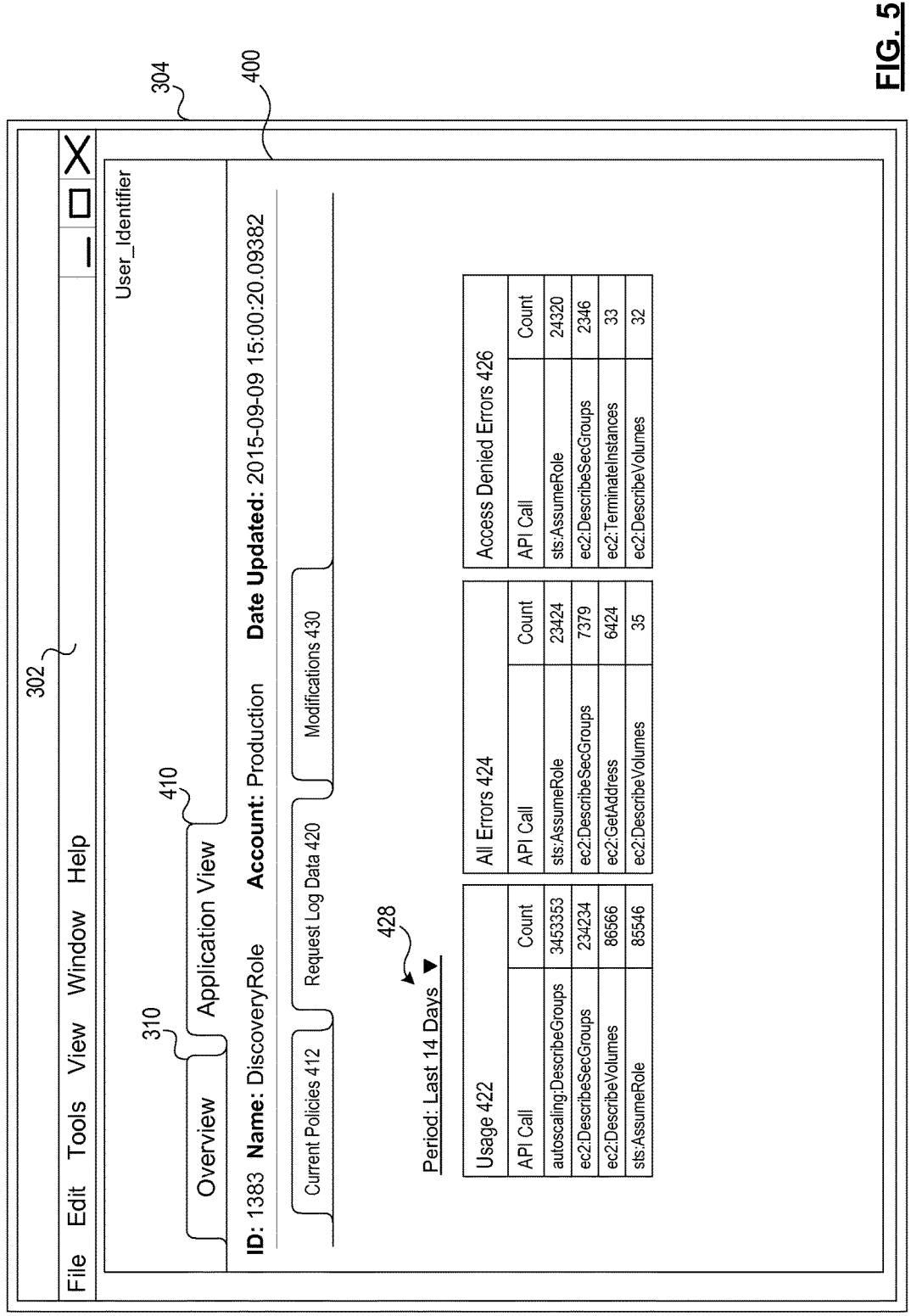

Referring now to FIG. 5, shown therein is the user interface 400 with the request log data tab 420 selected. With the request log data tab 420 selected, the user interface 400 presents information obtained from the request log 124 of the distributed computing infrastructure 120 by the monitoring service 128 of FIG. 1. The request log 124 includes information regarding access calls made by a user, application, or other entity. The request log 124 further includes a count of errors and a count of access denied errors. As illustrated in FIG. 5, the request log data 420 includes a usage table 422, all errors table 424, and an access denied errors table 426. The usage table 422 includes a listing of APIs called by the "DiscoveryRole" application and a count of each API call. The all errors table 424 includes a listing of API calls that resulted in errors and a count of those errors. The access denied errors table 426 includes a listing of API calls according to a count of access denied errors resulting from the API calls. As illustrated, the listings in the usage table 422, the all errors table 424, and the access denied errors table 426 are presented in order from highest count to lowest count. Each of these listings may be sorted according to another metric, such as alphabetically by API call. The user interface 400 of FIG. 5 further includes a period of observation selector 428. A user may interact with the period of observation selector 428 to select a period of observation, such as the last 15 minutes, the last day, or the last month. As illustrated, the user of the user interface 400 has selected a period of observation of 14 days.

Figure 6:
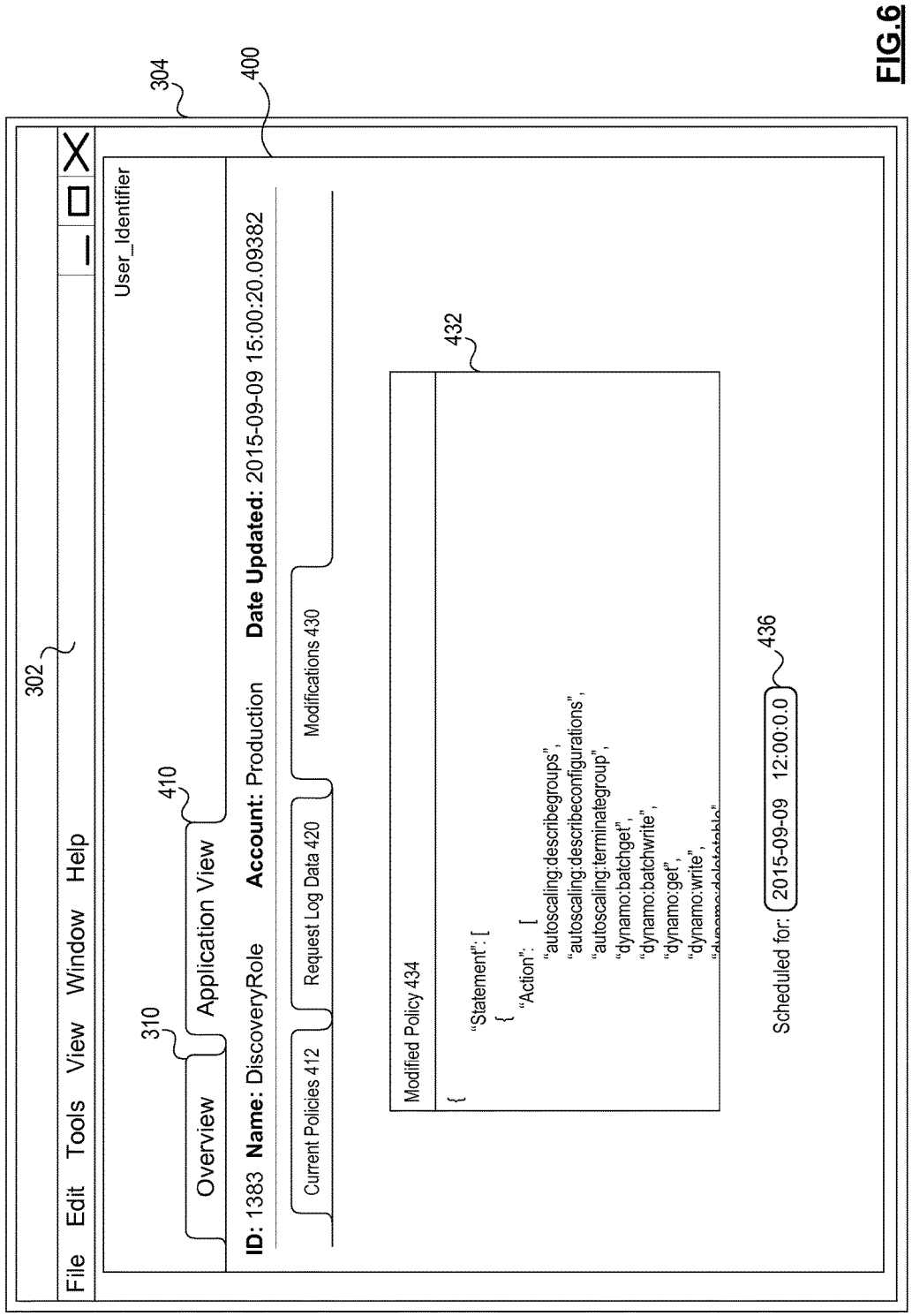

Referring now to FIG. 6, shown therein is the user interface 400 with the modifications tab 430 selected. When the modifications tab 430 is selected, a modified policy field 432 is presented in the user interface 400. The modified policy field 432 lists a modified policy 434 for the "DiscoveryRole" application. The modified policy 434 may include a subset of permissions as listed in the current policy field 414 of FIG. 4. For example, the access management server 102 may determine that permission to call a specific API is not warranted to the "DiscoveryRole" application based on information included in the request log 124 of FIG. 1. The access management server 102 may enact changes to the policy or policies associated with the "DiscoveryRole" application by editing a text file defining the policy. These changes may be part of a policy modification process. The access management server 102 may automatically schedule a time at which the modified policy will be implemented. This scheduled time is displayed in the scheduled time field 436. A user of the user interface 400 may interact with the scheduled time field 436 to alter the scheduled time. For example, the user may enter a different schedule time in the scheduled time field 436.

Figure 7:
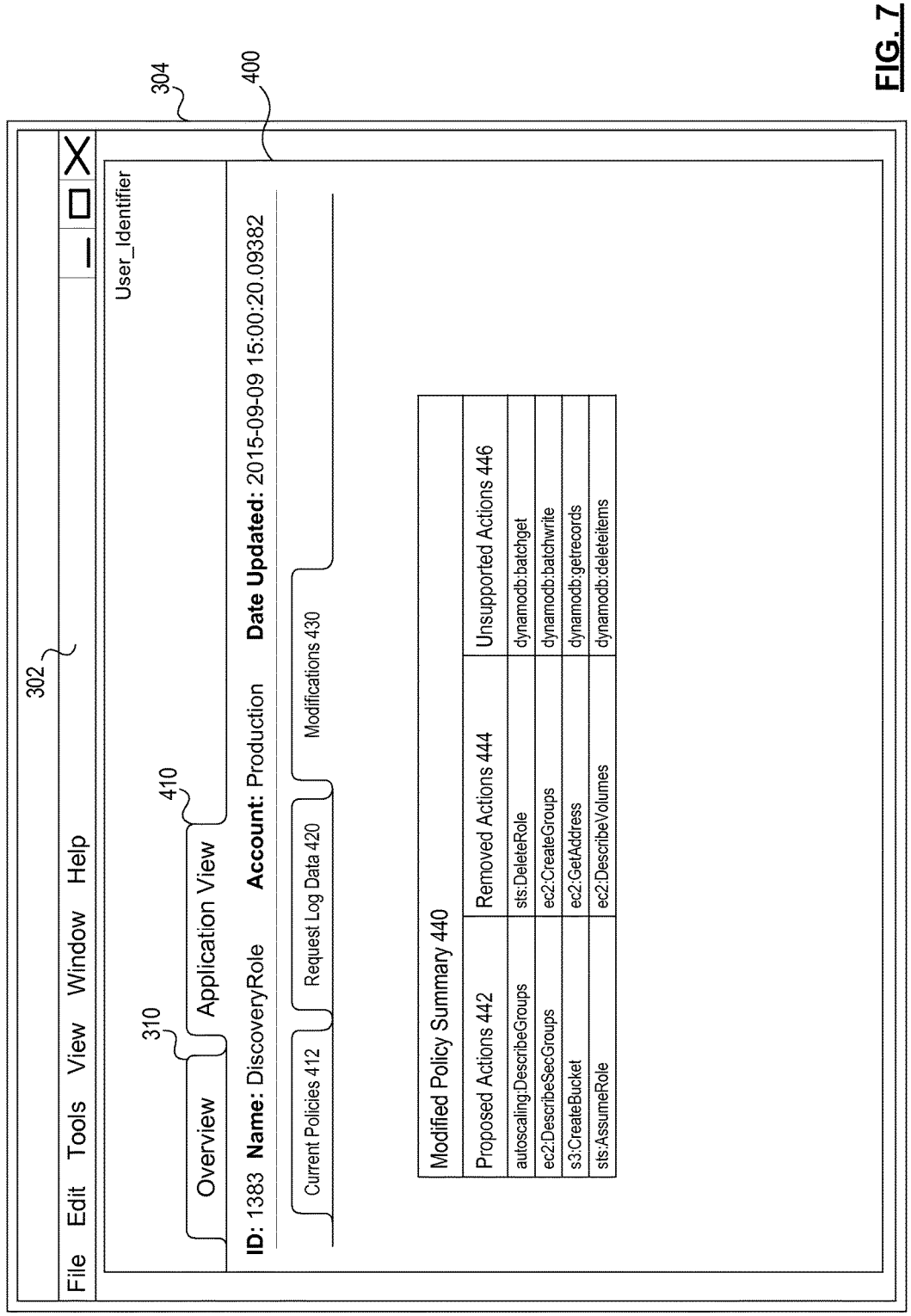

Referring now to FIG. 7, shown therein is the user interface 400, gain with the modifications tab 430 selected. The modifications tab 430 includes a modified policy summary 440. The modified policy summary 440 may be a table or collection of tables that summarize the modified access policy. As illustrated, the modified policy summary 440 includes a proposed actions list 442, a removed actions list 444, and an unsupported actions list 446. The proposed actions list 442 includes a listing of items to which the "DiscoveryRole" application is to have access after the modified access policy is implemented by the access management server 102 in the distributed computing infrastructure 120 of FIG. 1. The removed actions list 444 includes a listing of items (in the illustrated example, API calls) that are to be removed from the current policy or policies associated with the "DiscoveryRole" application. The unsupported actions list 446 includes a listing of API calls that are not monitored by the monitoring service 128 of FIG. 1. Access to such API calls may not be automatically modified by the access management server 102, and so may be provided in the user interface 400 to inform a user that these API calls may need to be monitored manually.

Figure 8:
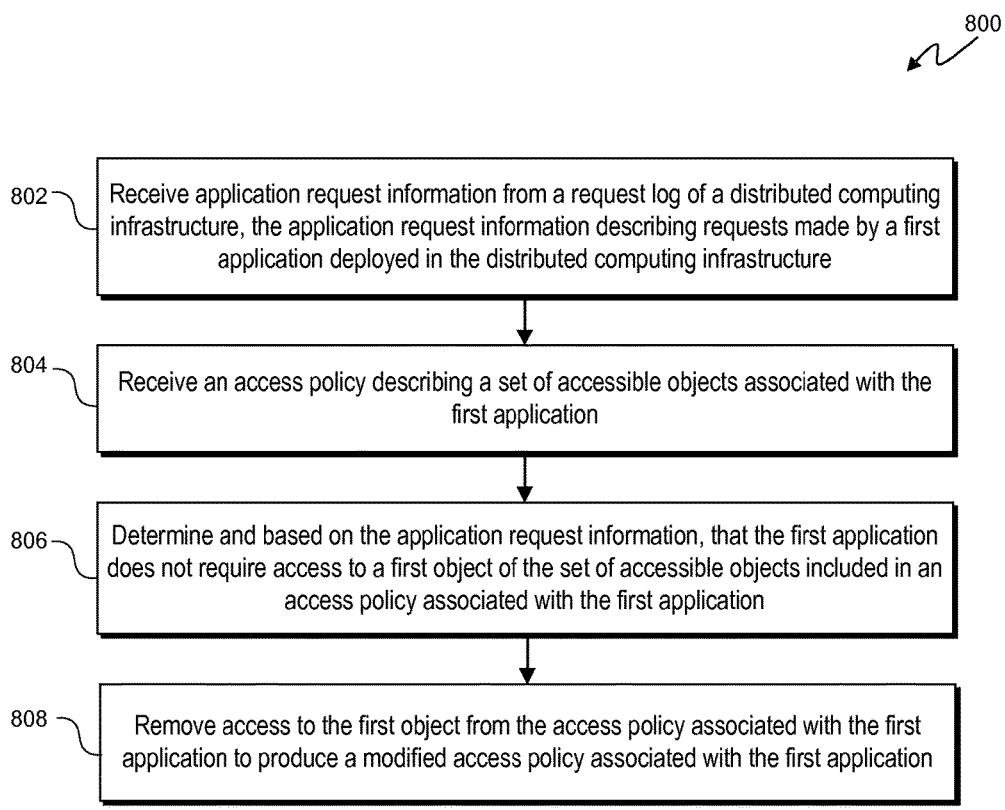
FIG. 8 is a flowchart illustrating a method of managing access permissions in a distributed computing environment, according to some aspects of the present disclosure.

Referring now to FIG. 8, shown therein is a flowchart of a method 800 for managing access permissions. As illustrated, method 800 includes several enumerated steps or operations. Embodiments of the method 800 may include additional steps or operations before, after, in between, or as part of the enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 800. Embodiments of the method 800 may be performed by execution of an application, such as the access management applications 104 and 220 of FIGS. 1 and 2, respectively.

Embodiments of the method 800 may begin at step 802 at which a processing device in communication with one or more storage devices receives application request information from a request log of a distributed computing infrastructure. The application request information describing requests made by a first application deployed in the distributed computing infrastructure. For example, the processing device of the access management server 102 may receive information from the request log 124 of the distributed computing infrastructure 120 is illustrated in FIG. 1. The request log 124 may be a searchable database of information regarding requests for access to an object, such as APIs associated with resources 122A, 122B, 122C, and/or 122D. The distributed computing infrastructure 120 may include a search engine operating on a search server, such as an Elasticsearch server, to facilitate access to information included in the request log 124. In some embodiments, the request log 124 may be provided by AWS CloudTrail and may include an identity of the user or application that called the API, the time of the API call, a source and dress of the API collar, a region of the distributed computing infrastructure 120 that is associated with the call, call parameters, and/or response elements returned by the distributed computing infrastructure 120.

At step 804, the processing device may receive an access policy describing a set of accessible objects associated with the first application. For example, the processing device of the access management server 102 may communicate with the security application 132 executing on the administration system 130 of FIG. 1. The security application 132 may communicate one or more of the access policies defined therein, such as the access policy 134A or access policy 134B. The access policy may define, in a variety of implementations, one or more objects that the first application is permitted access. For example, the access policy may define a set of APIs that are accessible to the first application, or which the first application may call within the distributed computing infrastructure 120. The access policy may define the set of APIs accessible to the first application by listing the APIs or by providing a level of access that corresponds to a predefined subset of APIs exposed by the distributed computing infrastructure 120 on the account within the distributed computing infrastructure 120 associated with the first application.

At step 806, the processing device, based on the application request information, may determine that that the first application does not require access to a first object of the set of accessible objects included in a particular access policy associated with the first application. For example, the processing device of the access management server 102 may determine that the first application does not require access to a first API included in a set of accessible APIs defined by an access policy associated with the first application. In some embodiments, determining that the first application "does not require access" to the first API may include determining that the first application has not used or called the first API more than a threshold number of times during a given period of observation. In other embodiments, determining that the first application does not require access to the first API may include determining that the first application is producing more than a threshold number of errors when calling first API in the distributed computing infrastructure 120. The threshold number of errors may be defined in terms of the type of error produced by the API calls. For example, when calls to the first API result in access denied errors, the threshold number of errors may be lower than when the first API calls result in different types of errors, for example errors resulting from improper parameters included in the API call.

At step 808, the processing device may remove access to the first object from the access policy associated with the first application to produce a modified access policy associated with the first application. This modified access policy may be stored in the administration system 130 in association with the security application 132. For example, the processing device of the access management server 102 may modify an access policy associated with a first application to remove an API from a set of APIs that were accessible to the first application according to the API from a list of APIs included in the access policy or by altering an access level indicated by the access policy.

Embodiments of the method 800 may further include operations, performed by the processing device, such as receiving a request from a user associated with the first application to reinstate access to the first object, or in some embodiments, the first API. The request may be received through a user interface such as the user interface 300 of FIG. 3, by which the user may select the first API from a listing of recent changes in the access policy associated with the first application. The user may select a button or other user interface element to cause the request to be sent from a client device associated with the user. Embodiments of the method 800 may further include determining that the request satisfies predetermined conditions for reinstatement of access to the first object and adding access to the first object in the modified access policy associated with the first application to produce a newly modified access policy associated with the first application. For example, the access management server 102 may receive the request initiated by the user via the user interface 300. The access management server 102 may check to see whether the request is received before predetermined time after removal of access to the first object, whether the removal of access to the first object or first API resulted from a lack of requests to access the first object during the period of observation, and/or whether the first object is not included on a list of secure objects. For example, the security application 132 may include a list of APIs that may require the intervention of administrative security personnel for reinstatement. When the requested API is on such a list of APIs, the access management server 102 may generate a communication and transmit that communication to administrative security personnel via a user interface, such as the user interface 700 of FIG. 7.

In some embodiments of the method 800, the processing device may monitor usage of a second object by the first application during the period of observation. For example, the access management server 102 may receive application request information from the request log 124 of the distributed computing infrastructure 120. Based on the usage or number of calls to a second API included in an access list of the first application, the processing device may determine that the usage of the second API the first application is less than a threshold usage value. The processing device of the access management server may schedule removal of access to the second API based on the usage thereof. Upon scheduling the removal of access to the second API, the access management server 102 may transmit a communication to a first user associated with the first application. For example, the access management server 102 may send an email, text message, or push notification, to a developer or developer team having responsibility for the first application. The communication transmitted by the access management server 102 may identify the first application, the second API, and the time at which removal of access to the second API is scheduled. The communication may be received by the user in the user interface 300 of FIG. 3.

Embodiments of the method 800 may further include operations of receiving a request from the first user to prevent the scheduled removal of access to the second object, determining that the request satisfies one or more conditions, and automatically preventing the scheduled removal of access to the second object by the first application. For example, via the user interface 300 of FIG. 3, the user may manipulate a user interface element such as the stop button to request that the scheduled removal of access to a second API be unscheduled or be stopped. For example, the second API may have been included in an earlier stage of development of the first application, wherein the earlier stage of development did not require access to the second API. When the first application enters or approaches a follow-on stage of development, the first application may need to call the second API to implement features to be deployed by the first application in this subsequent stage of development. Using the user interface 300 of FIG. 3 or another user interface provided by the access management server 102 in communication with a client device, a developer associated with the first application may be able to request that the scheduled removal not occur. Depending on the satisfaction of one or more conditions, such as the second API to which access is scheduled to be removed, the access management server 102 may automatically prevent the scheduled removal of access to the second API.

Figure 9:
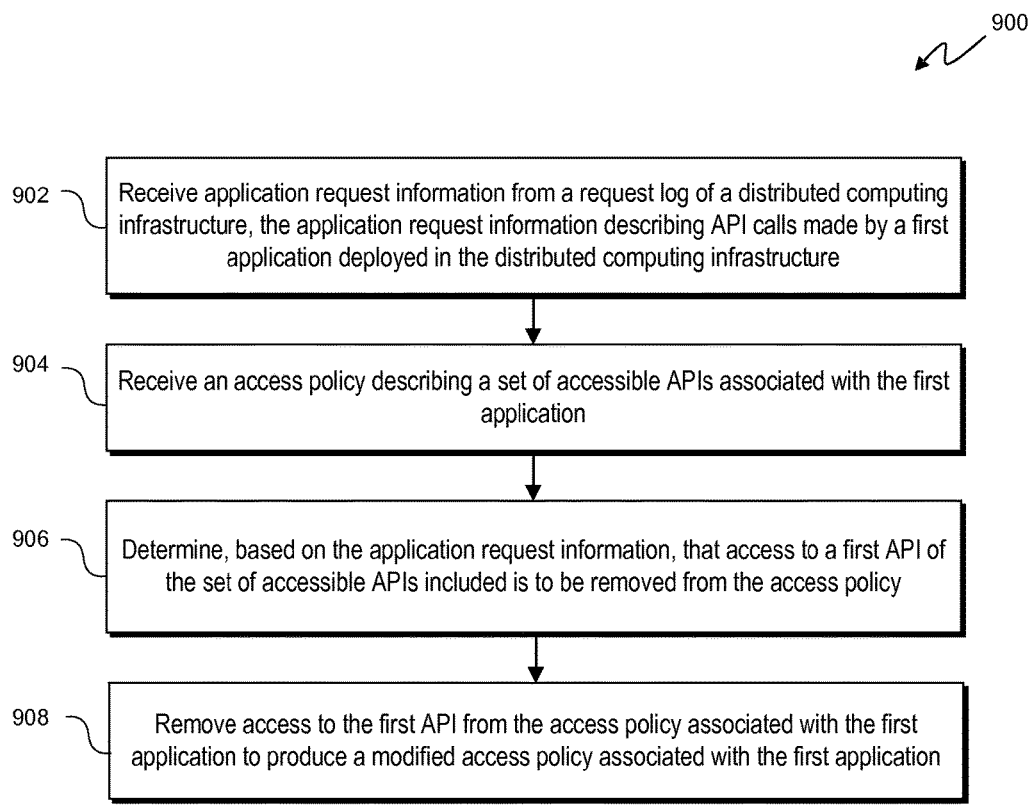
FIG. 9 is a flowchart illustrating a method of managing access permissions in a distributed computing environment, according to some aspects of the present disclosure.

Referring now to FIG. 9, illustrated therein is a flowchart of a method 900 of managing access permissions within a distributed computing infrastructure. The access permissions may be granted, revoked, reinstated as part of a management process. As illustrated, method 900 includes several enumerated steps or operations. Embodiments of the method 900 may include additional steps or operations before, after, in between, or as part of the enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 900. Embodiments of the method 900 may be performed by execution of an application, such as the access management applications 104 and 220 of FIGS. 1 and 2, respectively.

Embodiments of the method 900 may begin at step 902 at which a processing device receives application request information from a request log of a distributed computing infrastructure. The application request information may describe API calls made by a first application deployed in the distributed computing infrastructure. For example, the access management server 102 may include a processing device configured to receive application request information from a request log of the distributed computing infrastructure 120, as described herein.

At step 904, the processing device may receive an access policy describing a set of accessible APIs associated with the first application. For example, the access management server 102 may receive an access policy 134A, associated with the first application, from a security application 132 running on the administration system 130 of FIG. 1. At 906, based on the application request information and the access policy, the processing device may determine that access to a first API of the set of accessible APIs is to be removed from the access policy. For example, the access management server 102 may determine that an insufficient number of calls to the first API have been made during an observation period. As another example, the access management server 102 may determine that an excessive number of errors have resulted from calls and to the first API made during an observation or at a rate that is higher than a permitted rate.

At step 908, the processing device may remove access to the first API from the access policy associated with the first application to produce a modified access policy associated with the first application. Accordingly, the modified access policy associated with the first application may have more limited access to a set of APIs as compared to the access policy prior to modification by the access management server 102.

In some embodiments of the method 900, the processing device may receive a request to reinstate access to the first API in the access policy associated with the first application. For example, the access management server 102 may receive a request to reinstate the first API from a client device associated with a first user, such as one of the client devices 140A and 140B. Thereafter, the processing device may reinstate access to the first API in the access policy associated with the first application based on the received request.

Embodiments of the presently disclosed systems, servers, devices, and methods may provide for management of access permissions, including access permissions to APIs exposed in a distributed computing infrastructure 120. Some embodiments of the present disclosure may permit an entity such as an application to begin with a first level of access that is curtailed or limited over time based on the usage of objects accessible at the first level of access. For example, a set of accessible APIs may be curtailed depending on the usage of the APIs during a period of observation. Some embodiments of the present disclosure may permit the curtailment of access when a rate of errors or count of errors associated with the access exceeds a defined threshold rate or count. This may prevent throttling of associated applications in an account on the distributed computing infrastructure 120, thereby improving performance of the associated applications.

Certain aspects of the present disclosure are set out the new following numbered clauses:

1. An access management system for managing permissions for applications deployed in a distributed computing infrastructure, the system comprising: an access management server having a processing device in communication with one or more coupled information storage systems; a distributed computing infrastructure having a plurality of resource instances and a request log, the distributed computing infrastructure being in communication with the access management system; an administration system having a security application executing thereon, the security application having a plurality of access policies associated with each of a plurality of applications; and wherein the processing device of the access management server: receives application request information from the request log, the application request information describing requests made by a first application of the plurality of applications being monitored by the access management server, receives an access policy describing a set of accessible APIs associated with the first application from the security application, determines that access to a first API of the set of accessible APIs associated the first application should be removed, and modifies the access policy to remove access to the first API of the set of accessible APIs associated with the first application.

2. The system of clause 1, further comprising a user interface accessible to a first user associated with the first application and to an administrative security user.

3. The system of clauses 1-2, wherein the processing device of the access management server is programmed to receive a request for reinstatement from the first user to reinstate access to the first API into the set of accessible APIs associated with the first application in the access policy associated with the first application.

4. The system of clauses 1-3, wherein the processing device determines that access to the first API of the set of accessible APIs associated the first application should be removed by monitoring usage associated with the first API of the set of accessible APIs by the first application.

5. The system of clauses 1-4, wherein the access management server automatically reinstates the first API when the request for reinstatement is received from the first user within a predetermined time period after the processing device modifies the access policy to remove access to the first API.

6. The system of clauses 1-5, wherein the processing device of the access management server generates a count of API calls made by the first application during a period of time and wherein determining that access to a first API of the set of accessible APIs associated the first application should be removed comprises determining that the count of API calls associated with the first API is below a threshold value.

7. The system of clauses 1-6, wherein the processing device of the access management server: schedules a modification of the access policy to remove a second API of the set of accessible APIs; transmits a communication to a client device associated with a first user, the communication indicating that access to the second API of the set of accessible APIs is scheduled to be removed at a scheduled time; receives a request via the client device associated with the first user to cancel the scheduled removal of the access policy to remove access to the second API; and cancels the scheduled removal in response to the request.

8. The system of clauses 1-7, wherein the processing device of the access management server: receives a request via a client device associated with the first user to reinstate the first API into the set of accessible APIs included in the access policy associated with the first application; transmits information regarding the request to a client device of the administrative security user, the information identifying the first user, the first API, and the first application; and receives instructions from the administrative security user via the client device, the instructions indicating whether the request is to be granted or denied.

9. The system of clauses 1-8, wherein the instructions from the administrative security user comprise comments of the administrative security user regarding the request, and wherein the processing device of the access management server transmits the comments to the client device associated with the first user.

9.1. A non-transitory computer-readable storage medium storing instructions that, when executed by one or more processing devices, cause the processing devices to perform any of the features recited in any of clauses 1-9.

9.2. A computer program product including instructions that, when implemented on one or more processing devices, carries out any of the features recited in any of clauses 1-9.

9.3. A method that, when implemented by one or more processing devices, performs operations providing any of the features recited in any of clauses 1-9.

10. A method comprising: receiving, by a processing device, application request information from a request log of a distributed computing infrastructure, the application request information describing requests made by a first application deployed in the distributed computing infrastructure; receiving an access policy describing a set of accessible objects associated with the first application; determining, by the processing device and based on the application request information, that the first application does not require access to a first object of the set of accessible objects included in an access policy associated with the first application; and removing, by the processing device, access to the first object from the access policy associated with the first application to produce a modified access policy associated with the first application.

11. The method of clause 10, further comprising: receiving a request from a user associated with the first application to reinstate access to the first object; determining, by the processing device, that the request satisfies predetermined conditions for reinstatement of access to the first object; and adding, by the processing device, access to the first object in the modified access policy associated with the first application to produce a newly modified access policy associated with the first application.

12. The method of clauses 10-11, wherein determining that the request satisfies predetermined conditions for reinstatement of access to the first object comprises at least one of: determining that the request is received before a predetermined time after removal of access to the first object; determining that the removal of access to the first object resulted from a lack of requests to access the first object during a period of observation; and determining that the first object is not included on a list of secured objects.

13. The method of clauses 10-12, wherein the first application is associated with a first account on the distributed computing infrastructure.

14. The method of clause 10-13, wherein the first object of the set of accessible objects is a first application programming interface (API) of a set of accessible APIs presented by the distributed computing infrastructure.

15. The method of clause 10-14, further comprising: monitoring, by the processing device, usage of a second object by the first application during a period of observation; determining that usage of the second object by the first application is below a threshold usage value; scheduling removal of access to the second object based on the usage of the second object; and transmitting a communication to a first user associated with the first application, the communication identifying the first application, the second object, and a scheduled time for removal of access to the second object.

16. The method of clause 10-15, further comprising: receiving a request from the first user to prevent the scheduled removal of access to the second object; determining that the request satisfies one or more conditions; and automatically preventing the scheduled removal of access to the second object by the first application.

16.1. A non-transitory computer-readable storage medium storing instructions that, when executed by one or more processing devices, cause the processing devices to perform any of the features recited in any of clauses 10-16.

16.2. A computer program product including instructions that, when implemented on one or more processing devices, carries out any of the features recited in any of clauses 10-16.

16.3. A computing system that, when implemented by one or more processing devices, performs operations providing any of the features recited in any of clauses 10-16.

17. A non-transitory computer-readable storage medium having instruction stored thereon that, when executed by a processing device, cause the processing device to perform operations comprising: receiving application request information from a request log of a distributed computing infrastructure, the application request information describing API calls made by a first application deployed in the distributed computing infrastructure; receiving an access policy describing a set of accessible APIs associated with the first application; determining, based on the application request information and the access policy, that access to a first API of the set of accessible APIs is to be removed from the access policy; and removing access to the first API from the access policy associated with the first application to produce a modified access policy associated with the first application.

18. The non-transitory computer-readable storage medium of clause 17, wherein the determining that access to a first API of the set of accessible APIs is to be removed from the access policy comprises determining that calls to the first API by the first application are generating a count of errors that is greater than a threshold error valve.

19. The non-transitory computer-readable storage medium of clauses 17-18, wherein determining that access to a first API of the set of accessible APIs is to be removed from the access policy comprises determining that usage of the first API by the first application is less than a threshold usage value.

20. The non-transitory computer-readable storage medium of clause 17-19, wherein the operations further comprise: receiving a request to reinstate access to the first API in the access policy associated with the first application, the request being received from a client device associated with a first user; and reinstating access to the first API in the access policy associated with the first application based on the received request.

20.1. A computer program product including instructions that, when implemented on one or more processing devices, carries out any of the features recited in any of clauses 17-20.

20.2. A computing system that, when implemented by one or more processing devices, performs operations providing any of the features recited in any of clauses 17-20.

20.3. A method that, when implemented by one or more processing devices, performs operations providing any of the features recited in any of clauses 17-20.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An access management system for managing permissions for applications deployed in a distributed computing infrastructure, the system comprising:
    an access management server having a processing device in communication with one or more coupled information storage systems;
    a distributed computing infrastructure having a plurality of resource instances and a request log, the distributed computing infrastructure being in communication with the access management system;
    an administration system having a security application executing thereon, the security application having a plurality of access policies associated with each of a plurality of applications; and
    wherein the processing device of the access management server:
        receives application request information from the request log, the application request information describing requests made by a first application of the plurality of applications being monitored by the access management server,
        receives an access policy describing a set of accessible APIs associated with the first application from the security application,
        determines that access to a first API of the set of accessible APIs associated with the first application should be removed, and
        modifies the access policy to remove access to the first API of the set of accessible APIs associated with the first application.

2. The access management system of claim 1, further comprising a user interface accessible to a first user associated with the first application and to an administrative security user.

3. The access management system of claim 1, wherein the processing device of the access management server is programmed to receive a request for reinstatement from a first user to reinstate access to the first API into the set of accessible APIs associated with the first application in the access policy associated with the first application.

4. The access management system of claim 3, wherein the processing device determines that access to the first API of the set of accessible APIs associated with the first application should be removed by monitoring usage associated with the first API of the set of accessible APIs by the first application.

5. The access management system of claim 3, wherein the access management server automatically reinstates the first API when the request for reinstatement is received from the first user within a predetermined time period after the processing device modifies the access policy to remove access to the first API.

6. The access management system of claim 1, wherein the processing device of the access management server generates a count of API calls made by the first application during a period of time and wherein determining that access to a first API of the set of accessible APIs associated with the first application should be removed comprises determining that the count of API calls associated with the first API is below a threshold value.

7. The access management system of claim 1, wherein the processing device of the access management server:
    schedules a modification of the access policy to remove a second API of the set of accessible APIs;
    transmits a communication to a client device associated with a first user, the communication indicating that access to the second API of the set of accessible APIs is scheduled to be removed at a scheduled time;
    receives a request via the client device associated with the first user to cancel the scheduled removal of the access policy to remove access to the second API; and
    cancels the scheduled removal in response to the request.

8. The access management system of claim 2, wherein the processing device of the access management server:
    receives a request via a client device associated with the first user to reinstate the first API into the set of accessible APIs included in the access policy associated with the first application;
    transmits information regarding the request to a client device of the administrative security user, the information identifying the first user, the first API, and the first application; and
    receives instructions from the administrative security user via the client device, the instructions indicating whether the request is to be granted or denied.

9. The access management system of claim 8, wherein the instructions from the administrative security user comprise comments of the administrative security user regarding the request, and wherein the processing device of the access management server transmits the comments to the client device associated with the first user.

10. A method comprising:
    receiving, by a processing device, application request information from a request log of a distributed computing infrastructure, the application request information describing requests made by a first application deployed in the distributed computing infrastructure;

receiving an access policy describing a set of accessible objects associated with the first application;

determining, by the processing device and based on the application request information, that the first application does not require access to a first object of the set of accessible objects included in an access policy associated with the first application; and removing, by the processing device, access to the first object from the access policy associated with the first application to produce a modified access policy associated with the first application.

11. The method of claim 10, further comprising:

receiving a request from a user associated with the first application to reinstate access to the first object;

determining, by the processing device, that the request satisfies predetermined conditions for reinstatement of access to the first object; and adding, by the processing device, access to the first object in the modified access policy associated with the first application to produce a newly modified access policy associated with the first application.

12. The method of claim 11, wherein determining that the request satisfies predetermined conditions for reinstatement of access to the first object comprises at least one of:

determining that the request is received before a predetermined time after removal of access to the first object;

determining that the removal of access to the first object resulted from a lack of requests to access the first object during a period of observation; and determining that the first object is not included on a list of secured objects.

13. The method of claim 10, wherein the first application is associated with a first account on the distributed computing infrastructure.

14. The method of claim 10, wherein the first object of the set of accessible objects is a first application programming interface (API) of a set of accessible APIs presented by the distributed computing infrastructure.

15. The method of claim 10, further comprising:

monitoring, by the processing device, usage of a second object by the first application during a period of observation;

determining that usage of the second object by the first application is below a threshold usage value;

scheduling removal of access to the second object based on the usage of the second object; and transmitting a communication to a first user associated with the first application, the communication identifying the first application, the second object, and a scheduled time for removal of access to the second object.

16. The method of claim 15, further comprising:

receiving a request from the first user to prevent the scheduled removal of access to the second object;

determining that the request satisfies one or more conditions; and automatically preventing the scheduled removal of access to the second object by the first application.

17. A non-transitory computer-readable storage medium having instruction stored thereon that, when executed by a processing device, cause the processing device to perform operations comprising:

receiving application request information from a request log of a distributed computing infrastructure, the application request information describing API calls made by a first application deployed in the distributed computing infrastructure;

receiving an access policy describing a set of accessible APIs associated with the first application;

determining, based on the application request information and the access policy, that access to a first API of the set of accessible APIs is to be removed from the access policy; and removing access to the first API from the access policy associated with the first application to produce a modified access policy associated with the first application.

18. The non-transitory computer-readable storage medium of claim 17, wherein the determining that access to a first API of the set of accessible APIs is to be removed from the access policy comprises determining that calls to the first API by the first application are generating a count of errors that is greater than a threshold error valve.

19. The non-transitory computer-readable storage medium of claim 17, wherein determining that access to a first API of the set of accessible APIs is to be removed from the access policy comprises determining that usage of the first API by the first application is less than a threshold usage value.

20. The non-transitory computer-readable storage medium of claim 17, wherein the operations further comprise:

receiving a request to reinstate access to the first API in the access policy associated with the first application, the request being received from a client device associated with a first user; and reinstating access to the first API in the access policy associated with the first application based on the received request.

* * * * *